US008805647B2

(12) United States Patent
Smirnov et al.

(10) Patent No.: US 8,805,647 B2
(45) Date of Patent: Aug. 12, 2014

(54) EVALUATING AND PREDICTING COMPUTER SYSTEM PERFORMANCE USING KNEEPOINT ANALYSIS

(75) Inventors: George Smirnov, Littleton, MA (US); Leon Fairbanks, Littleton, MA (US); Kenneth Hu, Littleton, MA (US); David Kaeli, Littleton, MA (US)

(73) Assignee: NetApp, Inc., Sunnyvale, CA (US)

( * ) Notice: Subject to any disclaimer, the term of this patent is extended or adjusted under 35 U.S.C. 154(b) by 771 days.

(21) Appl. No.: 12/808,043

(22) PCT Filed: Dec. 22, 2008

(86) PCT No.: PCT/US2008/088062
§ 371 (c)(1),
(2), (4) Date: Dec. 2, 2010

(87) PCT Pub. No.: WO2009/086326
PCT Pub. Date: Jul. 9, 2009

(65) Prior Publication Data
US 2012/0290263 A1    Nov. 15, 2012

Related U.S. Application Data

(60) Provisional application No. 61/015,615, filed on Dec. 20, 2007.

(51) Int. Cl.
*G06F 11/30*    (2006.01)
(52) U.S. Cl.
USPC ........................................................ 702/186
(58) Field of Classification Search
None
See application file for complete search history.

(56) References Cited

U.S. PATENT DOCUMENTS

| | | | |
|---|---|---|---|
| 4,570,217 A * | 2/1986 | Allen et al. ..................... 700/83 |
| 5,780,994 A | 7/1998 | Sisemore | |
| 5,854,754 A | 12/1998 | Cabrera | |
| 5,867,494 A * | 2/1999 | Krishnaswamy et al. ..... 370/352 |
| 6,115,393 A * | 9/2000 | Engel et al. ................... 370/469 |
| 6,335,927 B1 * | 1/2002 | Elliott et al. .................. 370/352 |
| 6,633,878 B1 * | 10/2003 | Underwood .......................... 1/1 |
| 6,754,181 B1 * | 6/2004 | Elliott et al. .................. 370/252 |
| 6,795,966 B1 * | 9/2004 | Lim et al. .......................... 718/1 |
| 6,996,374 B1 * | 2/2006 | Bao et al. .................... 455/67.11 |
| 7,076,695 B2 * | 7/2006 | McGee et al. ............... 714/47.2 |
| 7,082,381 B1 * | 7/2006 | Saghier et al. ............... 702/182 |
| 7,197,428 B1 * | 3/2007 | Saghier et al. ............... 702/182 |
| 7,318,136 B2 * | 1/2008 | Fujibayashi .................. 711/162 |
| 7,369,967 B1 * | 5/2008 | Washburn et al. ........... 702/186 |
| 7,409,316 B1 * | 8/2008 | Saghier et al. ............... 702/182 |
| 7,437,281 B1 * | 10/2008 | Saghier et al. ................. 703/22 |
| 7,489,905 B2 * | 2/2009 | Qi et al. ..................... 455/67.11 |
| 7,499,766 B2 * | 3/2009 | Knight et al. ................. 700/107 |

(Continued)

OTHER PUBLICATIONS

Bradley Efron, Defining the Curvature of a Statistical Problem, Nov. 1975, The Annals of Statistics, vol. 3, No. 6., pp. 1189-1242.*

(Continued)

*Primary Examiner* — Sujoy Kundu
*Assistant Examiner* — Alvaro Fortich
(74) *Attorney, Agent, or Firm* — Kacvinsky Daisak Bluni, PLLC

(57) ABSTRACT

The present invention provides methods, systems, apparatus, and computer software/program code products adapted for operating in, or in conjunction with, an otherwise conventional computing system, and which enable evaluating, monitoring and predicting the performance of computer systems and individual elements or groups of elements within such computer systems.

9 Claims, 12 Drawing Sheets

(56) References Cited

U.S. PATENT DOCUMENTS

| | | | |
|---|---|---|---|
| 7,499,897 B2* | 3/2009 | Pinto et al. | 706/46 |
| 7,730,186 B2* | 6/2010 | Lai | 709/226 |
| 7,730,364 B2* | 6/2010 | Chang et al. | 714/47.2 |
| 7,734,451 B2* | 6/2010 | MacArthur et al. | 703/2 |
| 7,805,516 B2* | 9/2010 | Kettler et al. | 709/226 |
| 7,826,943 B2* | 11/2010 | Yu et al. | 701/31.2 |
| 7,996,814 B1* | 8/2011 | Qureshi et al. | 717/120 |
| 8,001,527 B1* | 8/2011 | Qureshi et al. | 717/120 |
| 8,015,454 B1* | 9/2011 | Harrison et al. | 714/47.3 |
| 8,347,148 B1* | 1/2013 | Harrison et al. | 714/47.1 |
| 2002/0064149 A1* | 5/2002 | Elliott et al. | 370/352 |
| 2002/0077795 A1* | 6/2002 | Woods et al. | 703/6 |
| 2003/0167151 A1* | 9/2003 | Ding et al. | 702/186 |
| 2003/0208743 A1* | 11/2003 | Chong et al. | 717/106 |
| 2003/0236822 A1* | 12/2003 | Graupner et al. | 709/203 |
| 2004/0122647 A1 | 6/2004 | Monroe | |
| 2004/0143565 A1* | 7/2004 | Berger et al. | 707/1 |
| 2005/0086335 A1* | 4/2005 | Liu et al. | 709/223 |
| 2005/0210255 A1* | 9/2005 | Kirovski | 713/176 |
| 2006/0030425 A1* | 2/2006 | Sukman | 473/345 |
| 2006/0078917 A1* | 4/2006 | Mishra et al. | 435/6 |
| 2006/0212512 A1* | 9/2006 | Grabarnik et al. | 709/203 |
| 2006/0276995 A1* | 12/2006 | Breitgand et al. | 702/179 |
| 2007/0022142 A1* | 1/2007 | Palmer et al. | 707/200 |
| 2007/0214374 A1* | 9/2007 | Hempstead et al. | 713/300 |
| 2007/0216880 A1* | 9/2007 | Qi et al. | 355/53 |
| 2007/0239497 A1* | 10/2007 | Fertig et al. | 705/7 |
| 2008/0049775 A1* | 2/2008 | Morrill et al. | 370/419 |
| 2009/0106174 A1* | 4/2009 | Battisha et al. | 706/12 |
| 2009/0109959 A1* | 4/2009 | Elliott et al. | 370/352 |
| 2009/0122706 A1* | 5/2009 | Alfano et al. | 370/237 |
| 2009/0279867 A1* | 11/2009 | Hamada et al. | 386/96 |
| 2009/0312119 A1* | 12/2009 | Sukman | 473/350 |
| 2010/0299128 A1* | 11/2010 | Aiber et al. | 703/21 |
| 2012/0284064 A1* | 11/2012 | Sussman et al. | 705/5 |

OTHER PUBLICATIONS

Bradley Efron (Defining the Curvature of a Statistical Problem. The Annals of Statistics, vol. 3, No. 6. (Nov. 1975), pp. 1189-1242).*

* cited by examiner

450

Definition of the End-Points of the Linearity Region

500

Definition of the Linearity Region

EVALUATING AND PREDICTING COMPUTER SYSTEM PERFORMANCE USING KNEEPOINT ANALYSIS

CROSS-REFERENCE TO RELATED APPLICATIONS

This application for patent claims the priority benefit of U.S. Provisional Patent Application Ser. No. 61/015,615 filed Dec. 20, 2007, entitled "Evaluating and Predicting Computer System Performance Using Kneepoint Analysis," which is incorporated by reference herein as if set forth in its entirety.

Also incorporated herein by reference in their entirety are U.S. patent application Ser. No. 11/773,825, filed Jul. 5, 2007, entitled "Managing Application System Load," and U.S. patent application Ser. No. 11/961,186, filed Dec. 20, 2007, entitled "Methods and Systems for Identifying Application System Storage Resources."

FIELD OF THE INVENTION

The present invention relates to methods, systems, apparatus, and computer software/program code for evaluating, monitoring and predicting the performance of computer systems or individual elements or groups of elements within such computer systems.

BACKGROUND OF THE INVENTION

In many computing environments, including, for example, network-based computing systems that may include multiple computing or processing units, storage units, storage networks, and other system resources, it is desirable to monitor the performance of the computing system or the performance of individual elements or groups of elements within the system. (The terms "computer system" and "computing system" are utilized substantially interchangeably herein unless otherwise indicated in particular circumstances.)

Computer system performance monitoring, evaluation and even prediction can be useful for a variety of reasons and purposes, such as determining whether additional storage, processing or other system resources may need to be added or brought online to meet quality of service or reliability requirements, to enable system balancing, and to provide application tuning, among other possible applications.

By way of example, FIG. 1 is a schematic diagram depicting general aspects of a conventional computing system 100 that might be found in the prior art. A computing system such as that shown in FIG. 1 can include a Storage Array Network (SAN) 120, a Network (such as a Local Area Network (LAN), Wide Area Network (WAN) or other form of network(s)), and a number of Central Processing Units (CPUs) 102, 104, . . . 106, etc.

Referring now to FIG. 2, it would be desirable to be able to monitor, or even predict, aspects of the performance of the computing system such as that shown in FIGS. 1 and 2, or the performance of individual elements or groups of elements in the computing system, such as SAN 120, network 110, or CPUs 102, 104, . . . 106, etc.

In FIG. 2, the functions of monitoring or predicting the performance of the computing system, or elements of the computing system (and corresponding devices, systems or computer software/program code products adapted for providing such functions), are represented schematically by performance monitoring meter, element, module or function 130. Referring again to FIG. 2, element 130 is shown in communication with the various elements of the computing system of FIG. 2, including SAN 120, network 110, or CPUs 102, 104, . . . 106, etc.

While various forms of elements, structures and computer software/program code products adapted to monitor the performance of computing systems are known in the prior art, it is the novel aspects of the structure, function and operation of element, module or function 130, utilizing kneepoint analysis (KPA) that form the subject of the present invention.

SUMMARY OF THE INVENTION

The present invention provides methods, systems, apparatus, and computer software/program code products adapted for operating in, or in conjunction with, an otherwise conventional computing system (such as that depicted in FIG. 1 attached hereto), and which enable evaluating, monitoring and predicting the performance of computer systems and individual elements or groups of elements within such computer systems.

In accordance with one aspect of the present invention, a computer system performance evaluation and prediction mechanism is based on utilization measurements of a computer system or its components.

In a further aspect of the present invention, a computer system performance evaluation and prediction mechanism is based on a comparison of utilization of the computer system or its components to a coordinate of the kneepoint of the operating curve of the computer system or its components.

Another aspect of the present invention provides a method comprising: characterizing the throughput produced by a queuing network model (the throughput representing the utilization of each element in the queuing network), collecting runtime performance data from the computing system (the runtime performance data representing the present response time and resource utilization on individual elements on the computing system), using the utilization data for each element in the queuing network to define an operating curve, evaluating the operating curve to identify a "kneepoint" in the operating curve, and using kneepoint analysis to classify non-linear performance response in the computing system.

Another aspect of the invention provides a method of determining whether the performance of a computing system is likely to scale exponentially or faster than exponentially with respect to increased system load, the method comprising: (a) measuring utilization of one or more computing system components or groups of components to generate utilization information, wherein the utilization may vary over time; (b) generating, using the utilization information, an operating curve characteristics of the computing system; (c) determining at least one utilization value on the operating curve to be an x-coordinate of a kneepoint of the operating curve, the kneepoint being a unique property of the operating curve and being substantially constant for a performance queuing model representing one or more aspects of the performance of the computing system; (d) comparing a given utilization value to the x-coordinate of the kneepoint; (e) setting a bound based on the x-coordinate of the kneepoint; and (f) indicating an alarm condition when the given utilization value is above the bound based on the x-coordinate of the kneepoint.

In a further aspect of the invention, a kneepoint is determined using a set of kneepoint parameters, and the kneepoint parameters are calculated in closed analytical form for the linear operating region of the logarithm of the operating curve.

In another aspect of the invention, the linear operating region is a function solely of the queuing model; and in a further aspect of the invention, the linear operating region is calculated in a closed analytical form.

In still another aspect of the invention, the set of kneepoint parameters comprises curvature of the logarithm of the operating curve in the linear operating region, and bounds of the linear operating region comprise two points on the x-axis of operating curve.

A further aspect of the invention comprises evaluating system element performance by comparing system element utilization measurements with at least one operating curve kneepoint.

Each of these aspects will be discussed in greater detail below, along with various examples, embodiments and practices of the present invention.

Those skilled in the art will appreciate that while the following detailed description provides sufficient detail to enable one skilled in the art to practice the present invention, the various examples, embodiments and practices of the present invention that are discussed and described below, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF THE DRAWINGS

Those skilled in the art will readily understand the present invention based on the following Detailed Description, taken in connection with the attached drawings, in which.

DETAILED DESCRIPTION OF THE INVENTION

Figure 1:
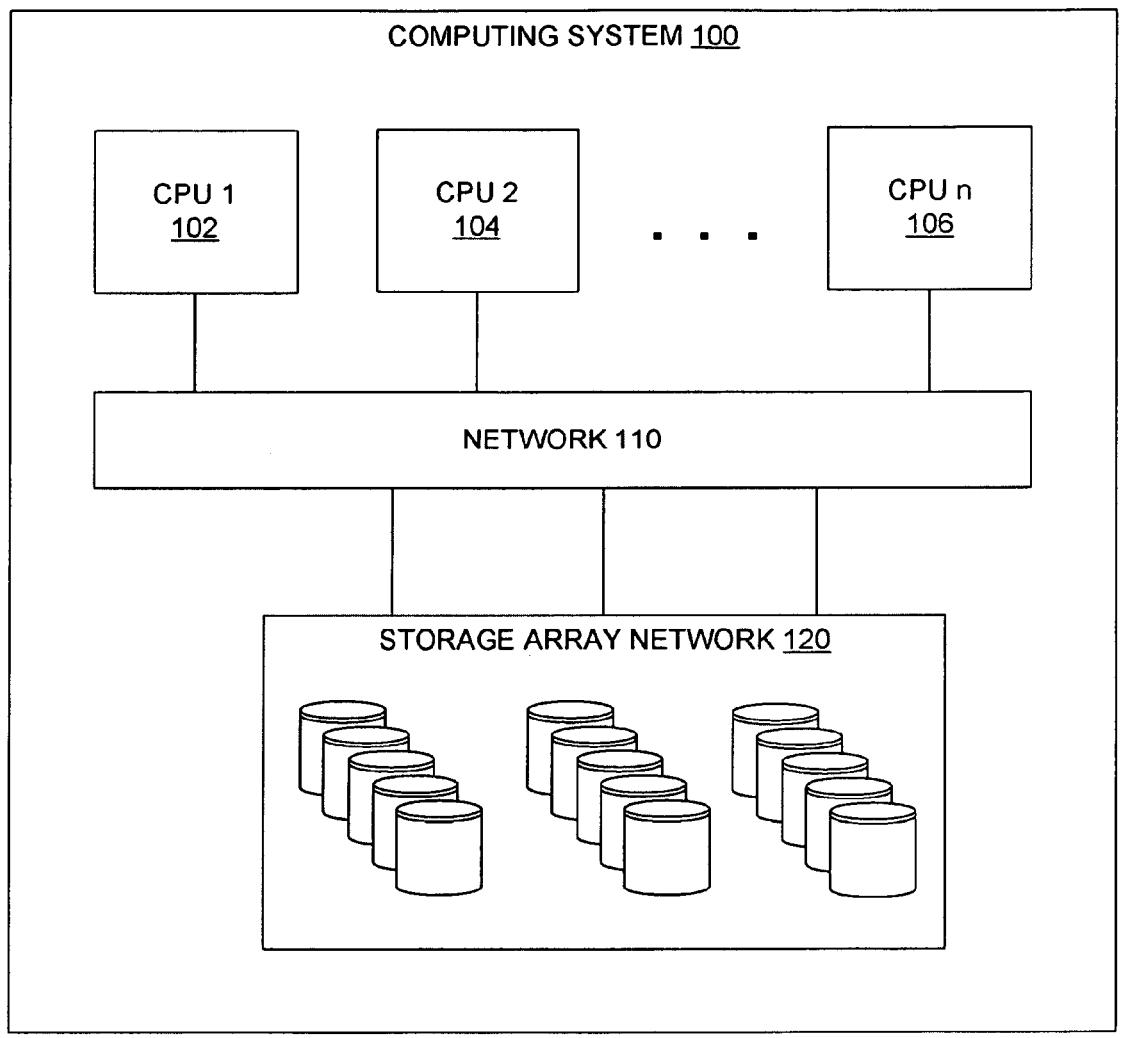
FIG. 1 is a schematic diagram depicting general aspects of a conventional computing system that might be found in the prior art.

The following description sets forth numerous specific details to provide an understanding of the invention. However, those skilled in the art will appreciate that the invention may be practiced without these specific details. In other instances, well-known methods, procedures, components, protocols, algorithms, and circuits have not been described in detail so as not to obscure the invention. The following discussion describes various aspects of the invention.

The present Detailed Description is organized into the following sections:

A. Kneepoint Analysis
   B. Examples and Embodiments
   C. Digital Processing Environment in Which the Invention Can Be Implemented
   D. Conclusion A. Kneepoint Analysis The concept of a kneepoint, and more particularly its application as in the present invention to monitoring, evaluating and even predicting the performance of computer or computing systems and their components, is a significant and novel aspect of the present invention.

The term "kneepoint," as used in the prior art, has been accorded various definitions in various fields of engineering. Some examples from various engineering fields include the following:

(1) The kneepoint or effective point of saturation is defined by ANSI/IEEE Standard as the intersection of the curve with a 45 degree tangent line.

(2) The International Electrotechnical Commission (IEC) defines the knee as the intersection of the straight lines from the non-saturated and saturated parts of the exciting curve.

In another example, in the prior art, U.S. Pat. No. 5,780,944 defines the detection of an inflection point for the purposes of identifying the current charging status of a battery. The prior art describes finding the first derivative of the battery's characteristic curve.

The present invention differs from the foregoing prior art examples, however, in a number of substantive and significant aspects. Unlike the prior art, methods, systems, devices, and computer software/program code products in accordance with the present invention look for a point of maximum curvature on a characteristic function generated from measurements of a computing system or its components.

The methods of the present invention are novel and unique to computer performance, and further, do not use the first derivative of the original operating curve, but instead use the curvature of the logarithm of the original operating curve.

In the field of mathematics the concepts of curvature are well known from ancient times and developed by many prominent mathematicians including Sir Isaac Newton and Gottfried Wilhelm Leibniz. However, these concepts of curvature have not heretofore been applied to analysis of computer system performance.

As applied to the context of a conventional computer system performance analysis, the present invention introduces a kneepoint and a kneepoint analysis for the first time, and does so in a novel manner that represents a significant performance advantage over the prior art. It will be understood that the present invention can be used in connection with otherwise conventional computer systems; information about those systems can be obtained using discovery techniques, such as those disclosed, for example, in U.S. patent application Ser. No. 11/773,825, filed Jul. 5, 2007, entitled "Managing Application System Load," and U.S. patent application Ser. No. 11/961,186, filed Dec. 20, 2007, entitled "Methods and Systems for Identifying Application System Storage Resources," both of which are incorporated by reference herein in their entirety.

In contrast to the use of the term "kneepoint" in the prior art, wherein the term is used to indicate a point where a system, object, substance, or the like undergoes a critical change resulting in a dramatic change in behavior, properties or appearance of the complete system, object, or substance (e.g., the vulcanization of rubber upon reaching a particular kneepoint temperature), the present invention defines a kneepoint more specifically to the performance of a computer system or its components, and we consider curvature as a way to identify changes in computer performance.

As discussed in greater detail below, definition of such a kneepoint for underlying computer systems or their components has the advantage of simplifying performance evaluation and prediction, by reducing analysis to a simple comparison of utilization of the computer system or its components vs. the underlying kneepoint.

Such a kneepoint then becomes a characteristic property of a computer system or its components, and can be calculated in the same, identical, straightforward, finite-time manner for substantially any computer system or its components.

We also define herein an operating curve of a computer system or computer system component, which is a plot of data points that show the response time of the computer system or computer system component as a function of the utilization of the computer system or computer system component. The utilization can also be referred to as "load."

B. Embodiments And Examples

Figure 4:
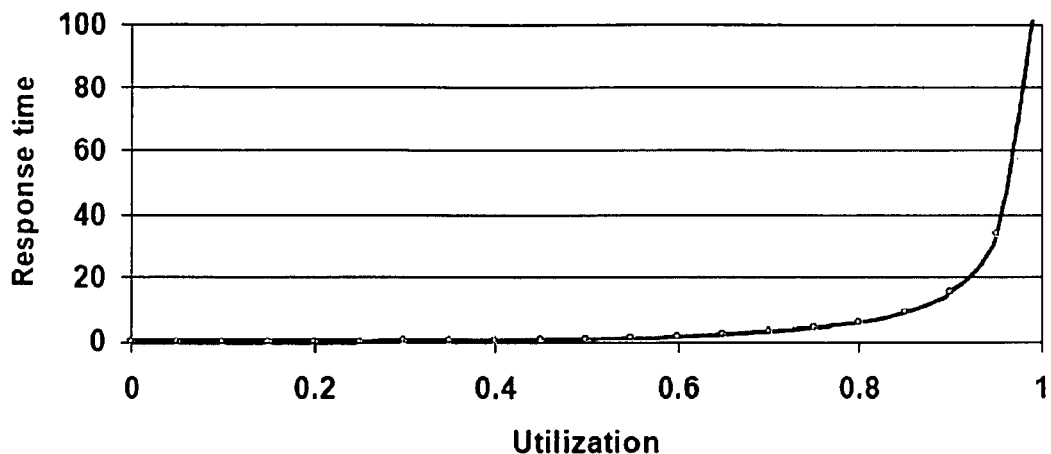
FIG. 4 is a plot of operating curve data for an exemplary computer system or its components.

Referring now to FIG. 4, plot 250 presents a typical operating curve of an individual computer system component or combination of computer system components. Most operating curves follow some form of common queuing discipline (e.g., the known M/M/1, M/D/1, M/G/1), though the present invention does not depend upon any particular queuing discipline and can more generally be applied to any performance curve that compares response time to load.

In accordance with the present invention, the operating curve is analyzed using kneepoint analysis to identify the kneepoint of the computer system and/or computer system component being analyzed. In the example of FIG. 4, the horizontal axis denotes the normalized utilization of a particular computer system or its components (e.g., bandwidth for a network, percent of the maximum transfer rate for a disk). The vertical axis denotes some measure of response time, queue time, or performance. (Those skilled in the art will understand that of course, a different arrangement of axes could be used in a practice of the present invention.)

Thus, the present invention provides a new definition of a kneepoint (KP) and kneepoint analysis (KPA).

The following illustrates, in accordance with aspects of the present invention, how to apply KPA to characterize the performance of a computer system or its components when processing a fixed amount of work (input) and producing some discrete amount of output.

Figure 3A:
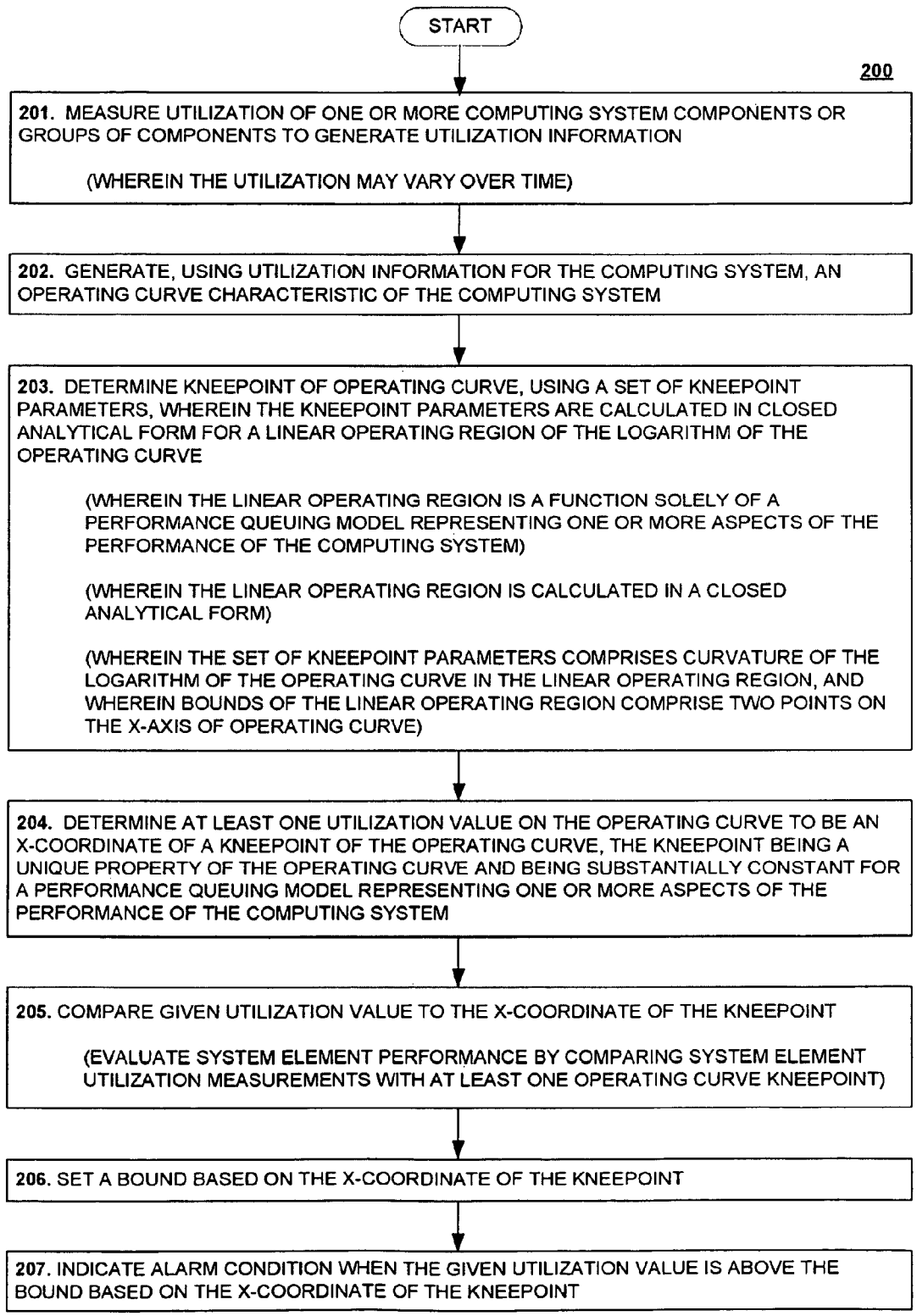
FIGS. 3A and 3B are flowcharts of techniques according to aspects of the invention for characterizing the performance of a computer system or its components.

As shown in FIG. 3A, a method 200 according to the present invention comprises the following:

201: Measure utilization of one or more computing system components or groups of components to generate utilization information (wherein the utilization may vary over time);

202: Generate, using utilization information for the computing system, an operating curve characteristic of the computing system;

203: Determine kneepoint of operating curve, using a set of kneepoint parameters, wherein the kneepoint parameters are calculated in closed analytical form for a linear operating region of the logarithm of the operating curve (wherein the linear operating region is a function solely of a performance queuing model representing one or more aspects of the performance of the computing system); (wherein the linear operating region is calculated in a closed analytical form); (wherein the set of kneepoint parameters comprises curvature of the logarithm of the operating curve in the linear operating region, and wherein bounds of the linear operating region comprise two points on the x-axis of operating curve);

204: Determine at least one utilization value on the operating curve to be an x-coordinate of a kneepoint of the operating curve, the kneepoint being a unique property of the operating curve and being substantially constant for a performance queuing model representing one or more aspects of the performance of the computing system;

205: Compare given utilization value to the x-coordinate of the kneepoint (evaluate system element performance by comparing system element utilization measurements with at least one operating curve kneepoint);

206: Set a bound based on the x-coordinate of the kneepoint;

207: Indicate alarm condition when the given utilization value is above the bound based on the x-coordinate of the kneepoint.

Figure 3B:
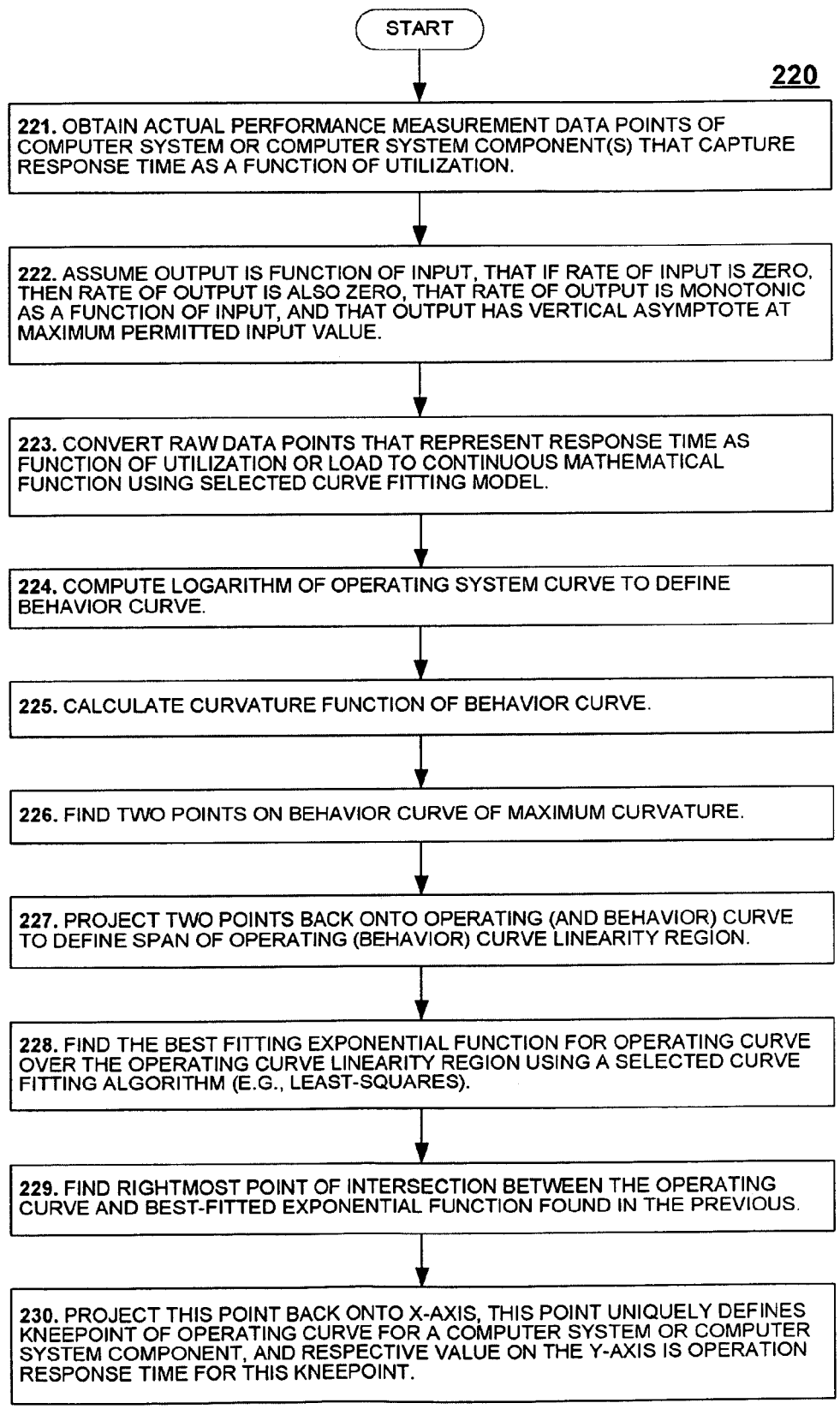

As shown in FIG. 3B, a further method 220 according to the present invention comprises the following:

221: Obtain actual performance measurement data points of a computer system or computer system component(s) (e.g., CPU, disk, network) that capture response time as a function of utilization.

a) Utilization in this context is the amount of input in measured units, normalized by the maximum permitted or possible input.

b) Response time is the amount of time elapsed, processing the fixed amount of input mentioned above in preferred units of time.

222: It is assumed that the output is a function of the input, and satisfies the following constraints:

a) If the rate of input is zero, then the rate of output is also zero.

b) The rate of output is monotonic as a function of input.

c) Output has a vertical asymptote at the maximum permitted input value mentioned above.

223: Convert the raw data points that represent the response time (plotted, for example, on the vertical axis) as a function of utilization or load (plotted, for example, on the horizontal axis) to a continuous mathematical function using a selected curve fitting model (e.g., least-squares curve fitting). Curve fitting techniques are well known, and the choice of curve fitting model, whether least-squares curve fitting or other, is left to the implementer. We will refer to this fitted curve as the operating curve for the computer system or computer system component(s).

224: Compute the logarithm of the operating system curve. We will refer to this new curve as the behavior curve. Note that the operating curve begins at zero and passes to infinity at a vertical asymptote. This implies that behavior curve monotonically rises from negative infinity to positive infinity and so its derivative goes from positive infinity to positive infinity and thus has only one minimum in between.

225: Calculate the curvature function of the behavior curve. A curvature function of a plane curve is well defined in mathematics. Because the behavior curve possesses a concave-upwards region on the left half of the curve and a concave-downward region on the right half of the curve, the curvature is assured to possess maximal negative and maximal positive curvature points.

226: Find two points on the behavior curve of maximal curvature. We can compute this by taking the first derivative of the curvature and identify zero values (i.e., inflection points). We can use these points to define the endpoints of the linearity region.

227: Project these two points back onto the operating (and behavior) curve. These two points define the span of the operating (behavior) curve linearity region.

228: Find the best fitting exponential function for operating curve over the operating curve linearity region using a selected curve fitting algorithm (e.g., least-squares).

229: Find rightmost point of intersection between the operating curve and the best-fitted exponential function found in the previous.

230: Project this point back onto the x-axis. This point uniquely defines the kneepoint of the operating curve for a computer system or computer system component. The respective value on the y-axis is the operation response time for this kneepoint.

Figure 5:
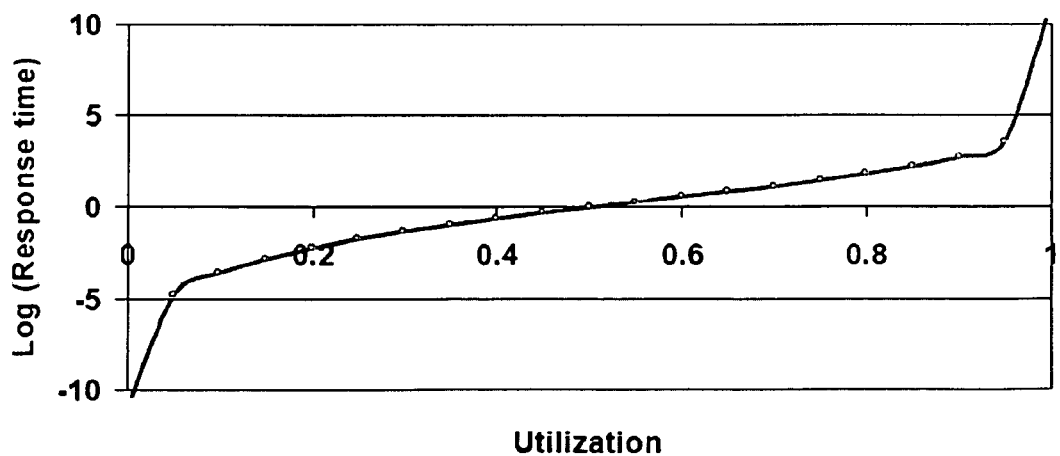
FIG. 5 is a plot of the behavior curve for the FIG. 4 operating curve data.

FIG. 5 is a plot 300 of the behavior curve for the original operating curve data 250 shown in FIG. 4, in accordance with an aspect of the invention. As can be seen by a review of FIG. 5, the curve exhibits strong linearity in the middle of the curve, as well as nonlinearity on the left and right portions of the curve. A wide range of classical queuing models, as well as observed real life queuing functions, exhibit this same behavior, though the graphs may be scaled.

Figure 6:
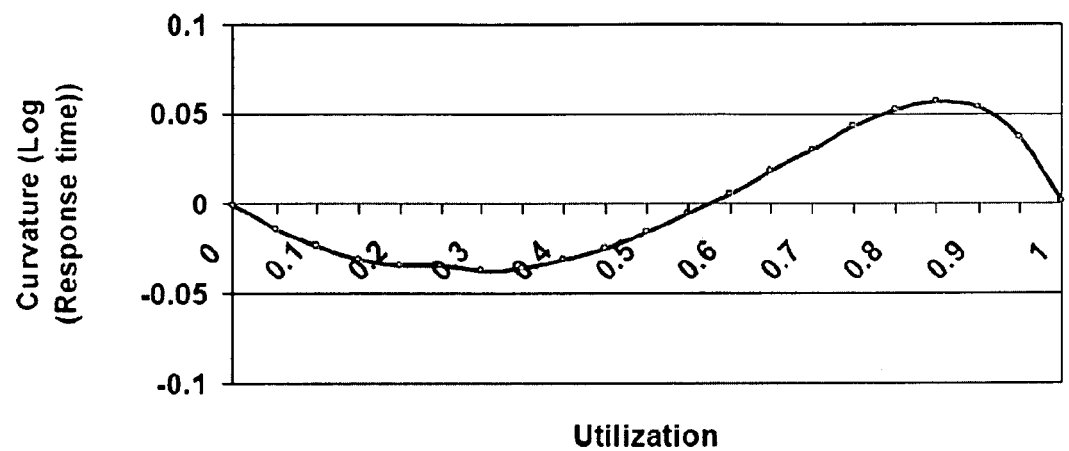
FIG. 6 is a plot of the curvature of the FIG. 5 behavior curve.

FIG. 6 is a plot 350 of the curvature of the behavior curve.

Figure 7:
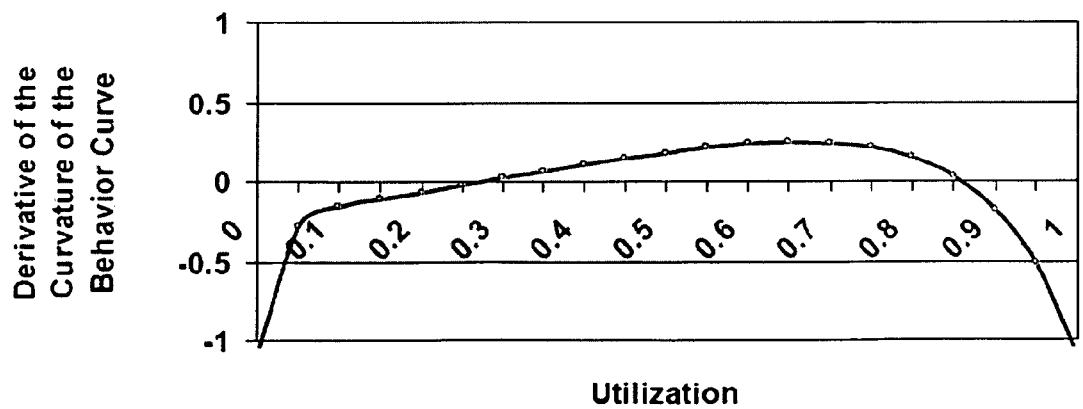
FIG. 7 is a plot of the first derivative of the FIG. 6 curvature function.

FIG. 7 is a plot 400 of the first derivative of the curvature function.

Figure 8:
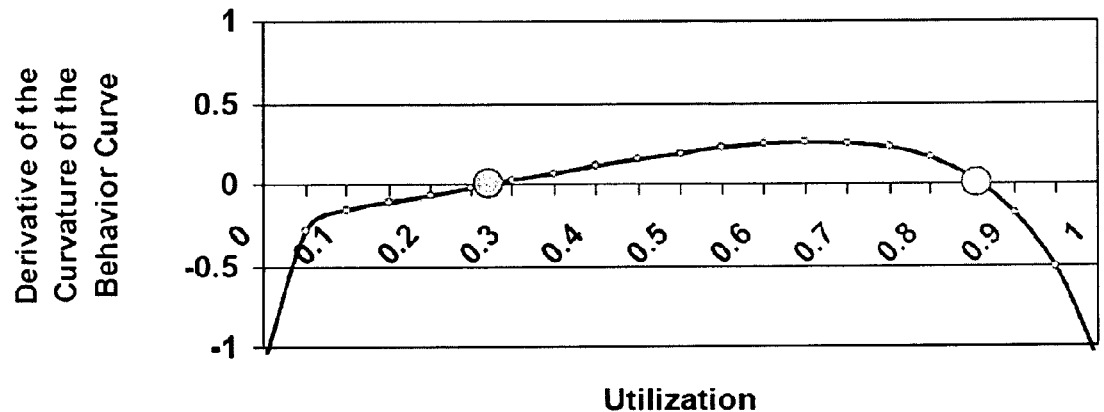
FIG. 8 is a plot identifying the two points on the FIG. 7 plot where the derivative of the curvature function is zero.

FIG. 8 is a plot 450 identifying the two points on the FIG. 7 plot 400 where the derivative of the curvature function is zero.

Figure 9:
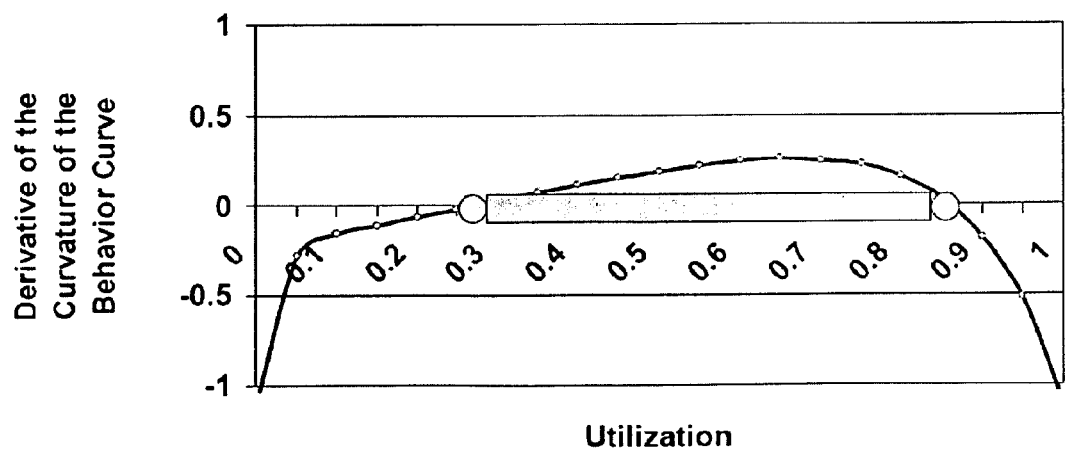
FIG. 9 is a plot identifying the values on the x-axis that define the linearity region.

FIG. 9 is a plot 500 identifying the values on the x-axis that define the linearity region.

Figure 10:
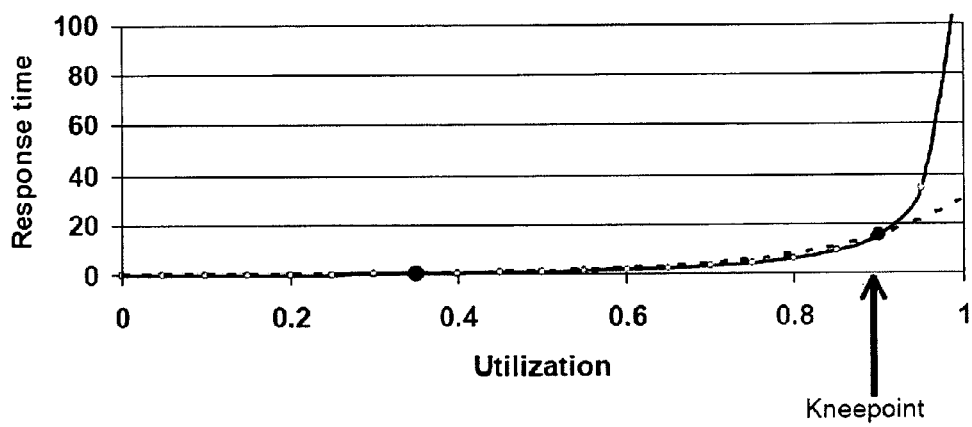
FIG. 10 is a plot projecting the linearity region back on the original operating curve shown in FIG. 4.

FIG. 10 is a plot 550 projecting the linearity region back on the original operating curve 250 presented in FIG. 4. FIG. 10 also fits a best-fit exponential curve to the points in the linearity region. The rightmost intercept of the best-fit exponential curve and the operating curve identifies the kneepoint of the operating curve.

FIG. 10 further projects the kneepoint onto the x-axis to identify the kneepoint utilization. A similar projection can be applied to the y-axis to identify the response time kneepoint.

It will be seen that these aspects track the method aspects of the flowchart of FIG. 3.

Using these techniques of the present invention, it will be seen that the invention can be implemented within, or in conjunction with, an otherwise conventional computer system, to provide, for example, a method of determining whether the performance of a computing system is likely to scale exponentially or faster than exponentially with respect to increased system load. Such a method comprises the following:

measuring utilization of one or more computing system components or groups of components to generate utilization information, wherein the utilization may vary over time;

generating, using the utilization information, an operating curve characteristics of the computing system;

determining at least one utilization value on the operating curve to be an x-coordinate of a kneepoint of the operating curve, the kneepoint being a unique property of the operating curve and being substantially constant for a performance queuing model representing one or more aspects of the performance of the computing system;

comparing a given utilization value to the x-coordinate of the kneepoint;

setting a bound based on the x-coordinate of the kneepoint; and indicating an alarm condition when the given utilization value is above the bound based on the x-coordinate of the kneepoint.

Also in accordance with the invention, a kneepoint can be determined using a set of kneepoint parameters, which can be calculated in closed analytical form for the linear operating region of the logarithm of the operating curve.

In accordance with these aspects of the present invention, the linear operating region is a function solely of the queuing model; and the linear operating region is calculated in a closed analytical form. The set of kneepoint parameters comprises curvature of the logarithm of the operating curve in the linear operating region, and bounds of the linear operating region comprise two points on the x-axis of operating curve.

Methods in accordance with the invention can also comprise evaluating system element performance by comparing system element utilization measurements with at least one operating curve kneepoint.

Figure 2:
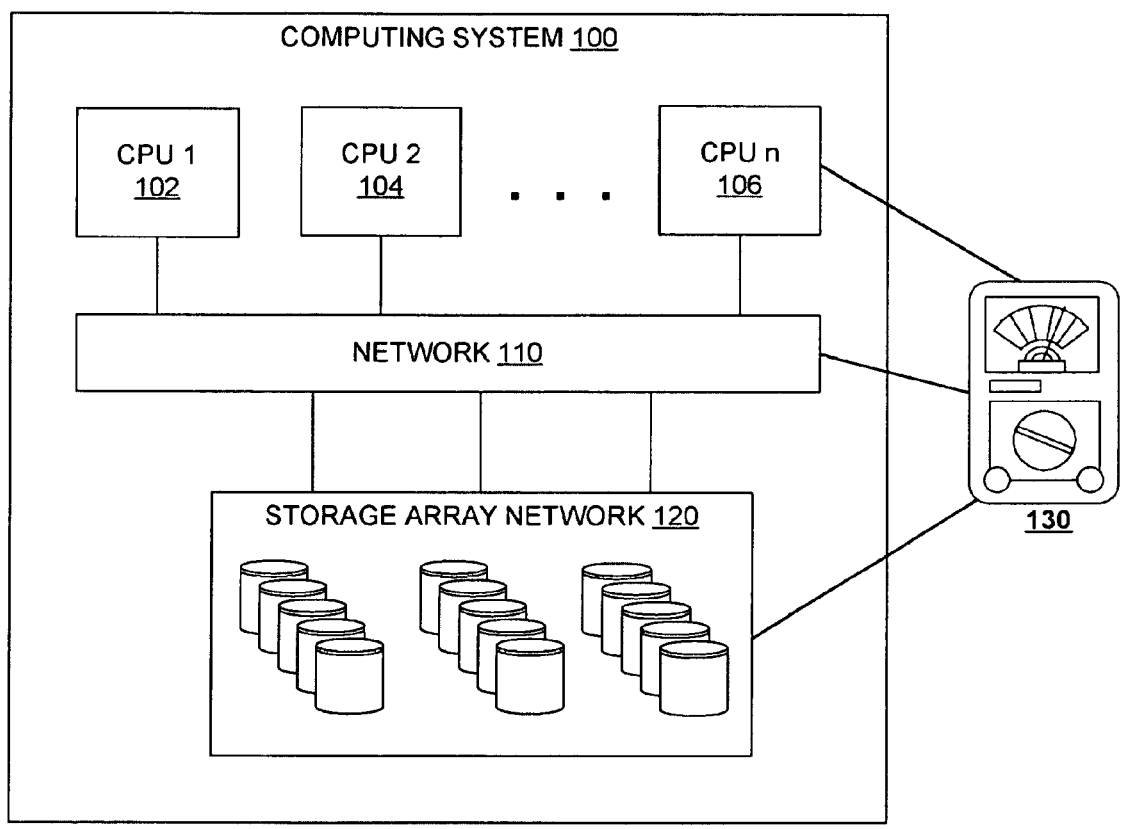
FIG. 2 is a schematic diagram in which a monitor has been connected to selected components of the FIG. 1 system.
Figure 11:
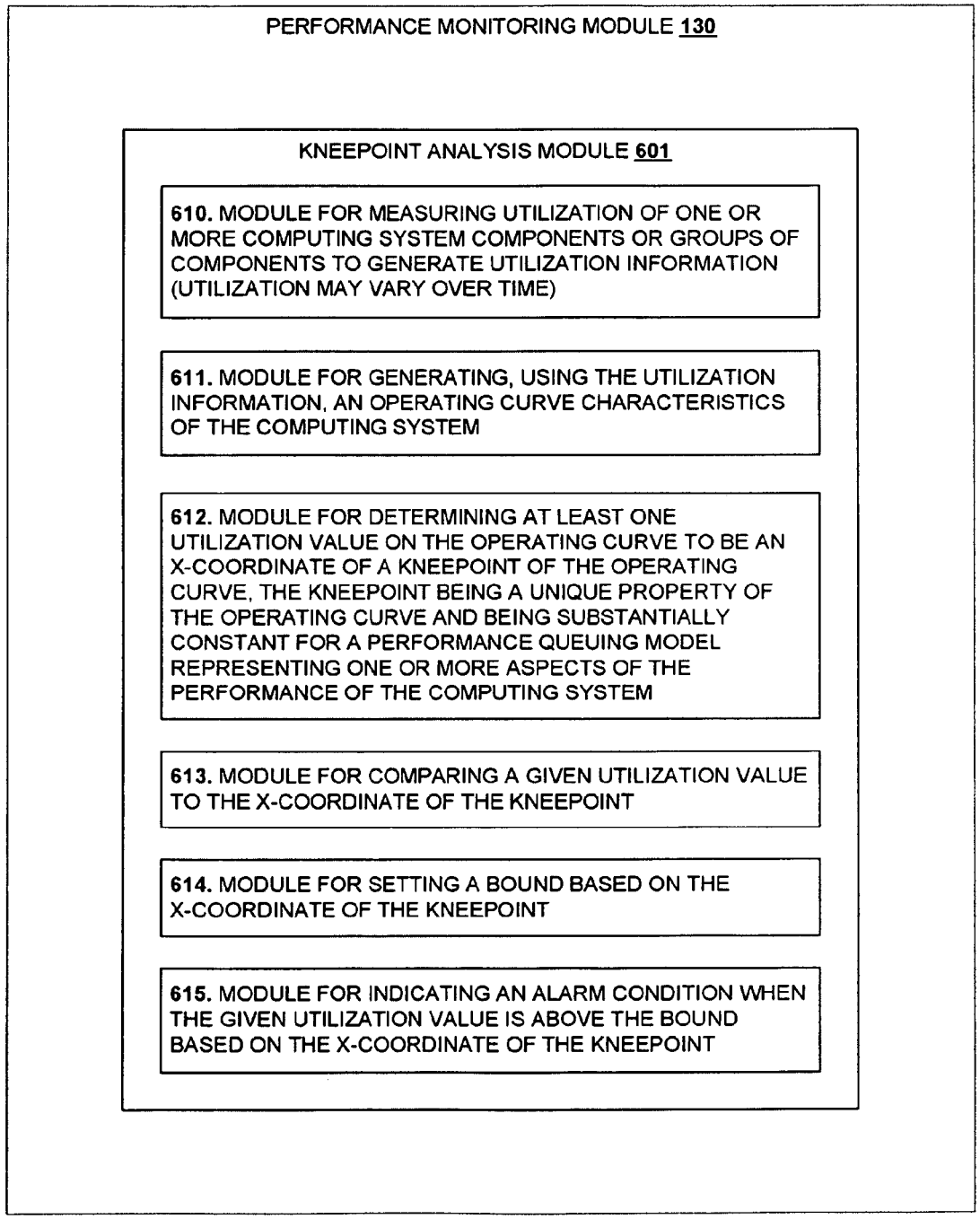
FIG. 11 is a generalized block diagram of an embodiment of the present invention.

FIG. 11 is a generalized block diagram of one embodiment of the present invention. As shown in FIG. 11, a kneepoint analysis module 601 can be part of a performance monitoring module 130 (FIG. 2) within a digital computing system; or alternatively, it can be a separate element. As also shown in FIG. 11, the kneepoint analysis module 601 can include hardware or software modules in electronic communication with each other for executing functions necessary for kneepoint analysis in accordance with the present invention, including:

Module 610 for measuring utilization of one or more computing system components or groups of components to generate utilization information (utilization may vary over time);

Module 611 for generating, using the utilization information, an operating curve characteristics of the computing system;

Module 612 for determining at least one utilization value on the operating curve to be an x-coordinate of a kneepoint of the operating curve, the kneepoint being a unique property of the operating curve and being substantially constant for a performance queuing model representing one or more aspects of the performance of the computing system;

Module 613 for comparing a given utilization value to the x-coordinate of the kneepoint;

Module 614 for setting a bound based on the x-coordinate of the kneepoint; and

Module 615 for indicating an alarm condition when the given utilization value is above the bound based on the x-coordinate of the kneepoint.

Those skilled in the art will appreciate that these modules can be implemented in computer software in a general purpose digital computer, or in other contexts.

C. Digital processing environment in which the invention Can be implemented

Figure 12A:
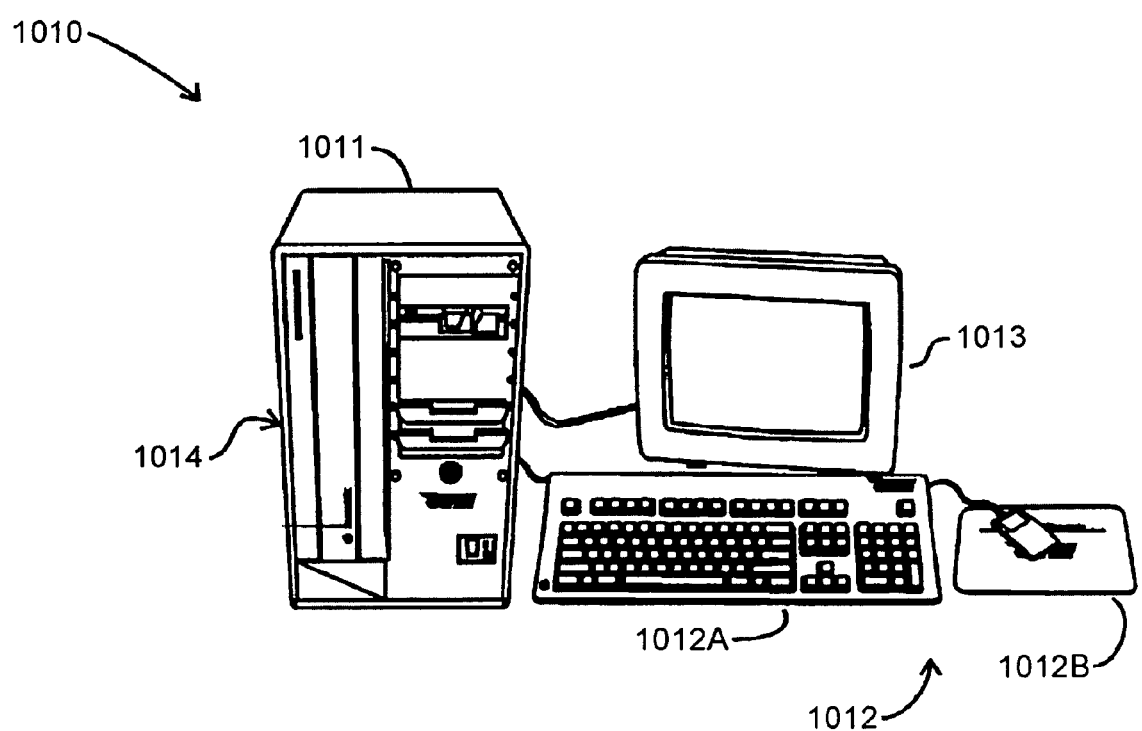
FIG. 12A (Prior Art) is a schematic diagram of a conventional workstation or PC (personal computer) digital computing system, on which the present invention may be implemented; or which may form a part of a networked digital computing system on which the present invention may be implemented.
Figure 12B:
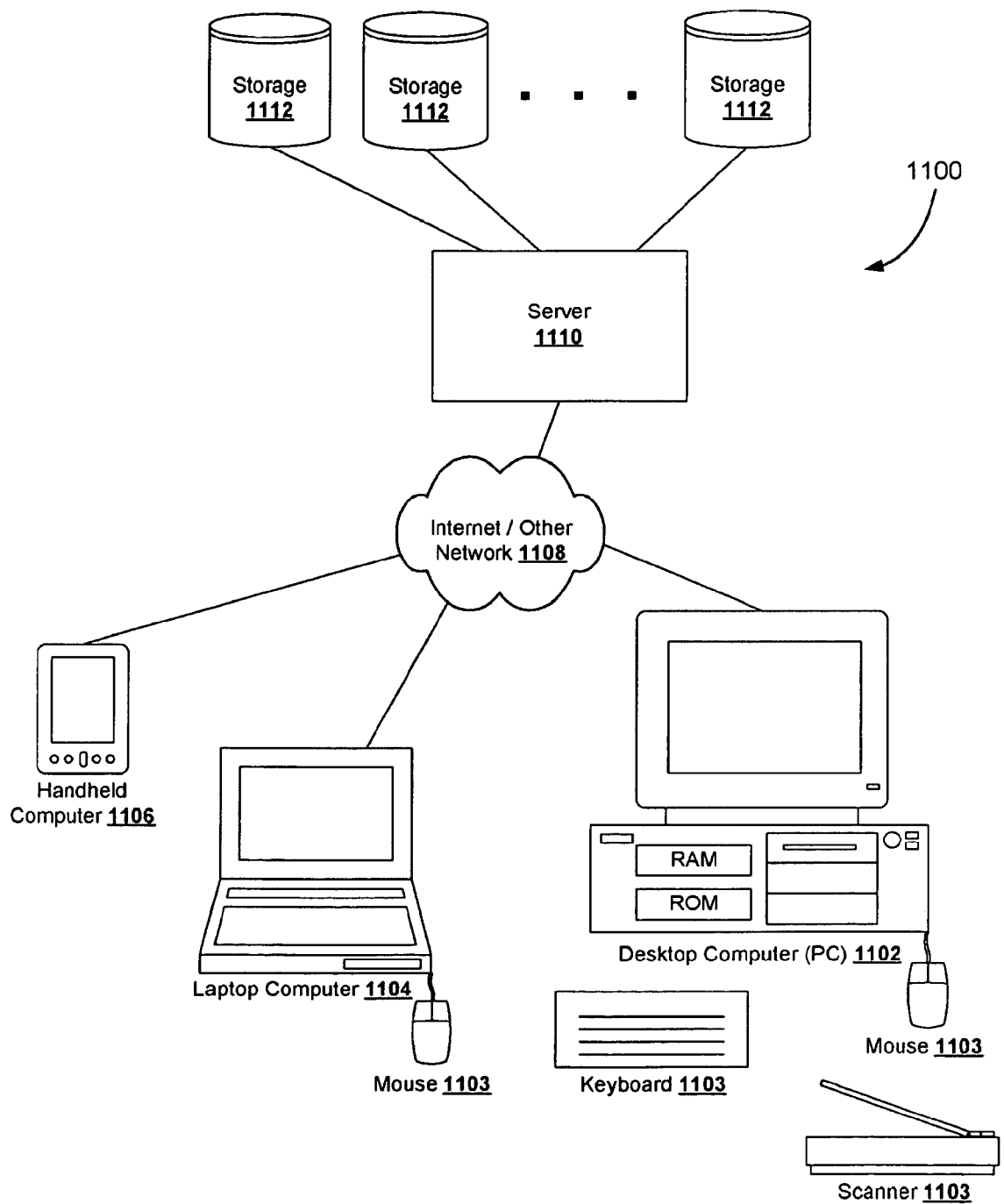
FIG. 12B (Prior Art) is a schematic diagram of a networked digital computing system on which the present invention may be implemented.
Figure 12C:
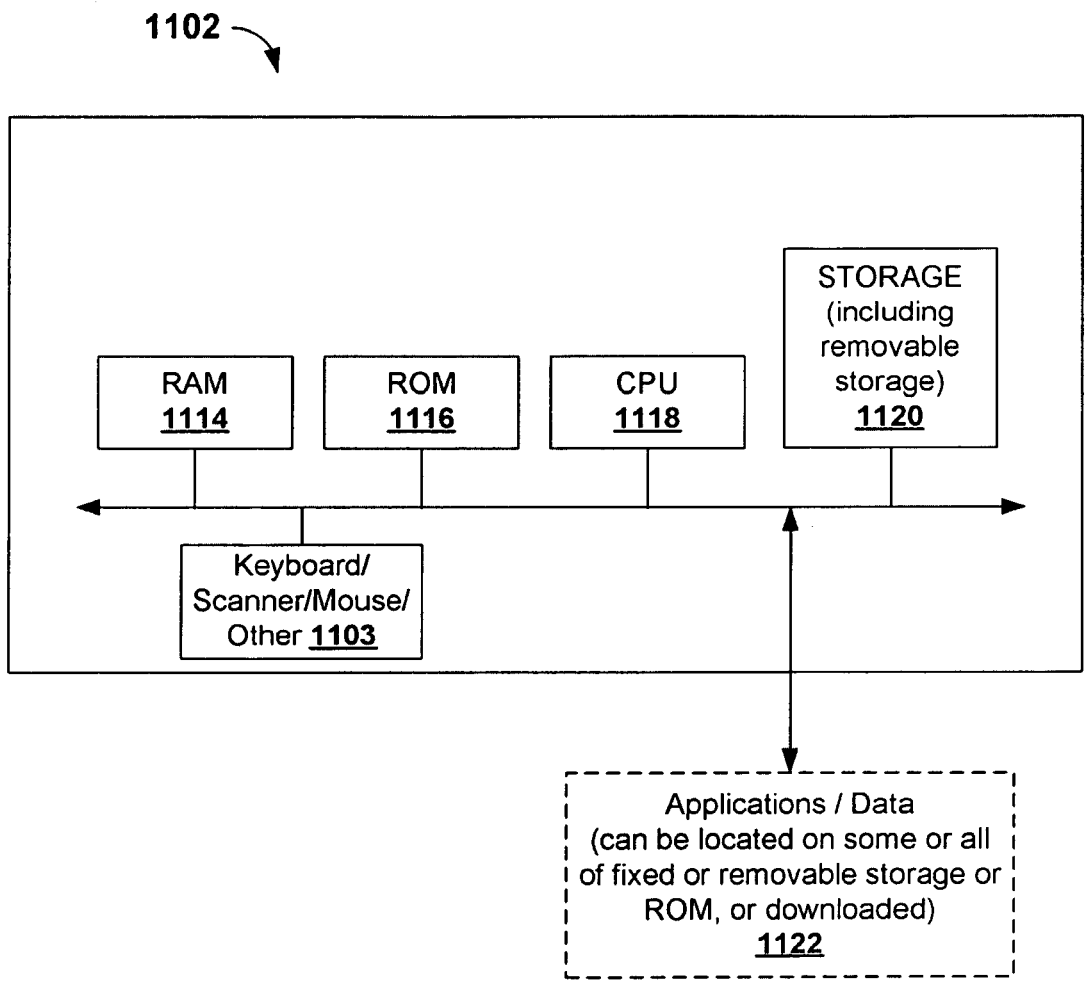
FIG. 12C (Prior Art) is a schematic diagram of components of a conventional workstation or PC environment like that depicted in FIG. 1.

Having described the present invention, the following is a discussion, to be read in connection with FIGS. 12A-C, of digital processing structures and environments in which the invention may be implemented and practiced.

It will be understood by those skilled in the art that the present invention provides methods, systems, devices and computer program products that enable more efficient application execution on applications commonly found on compute server class systems. These applications include database, web-server and email-server applications. These applications are commonly used to support a medium to large group of computer users simultaneously. These applications provide coherent and organized access and sharing by multiple users to a shared set of data. The applications can be hosted on multiple or a single shared set of digital computing systems. The set of tasks carried out on each application dictates the patterns and loads generated on the digital computing system, which can be managed through a set of configurable application parameters.

The present invention can thus be implemented in a number of different contexts including, but not limited to, a separate software application, part of the computer system operating system software, or the like. The present invention may be implemented as a separate, stand-alone system. The implementation may include user interface elements such as a keyboard and/or mouse, memory, storage, and other conventional user-interface components. While conventional components of such kind are well known to those skilled in the art, and thus need not be described in great detail herein, the following overview indicates how the present invention can be implemented in conjunction with such components in a digital computer system.

More, particularly, those skilled in the art will understand that the present invention can be utilized in the profiling and analysis of digital computer system performance and application tuning. The techniques described herein can be practiced as part of a digital computer system, in which performance data is periodically collected and analyzed adaptively, or in other like contexts.

The above detailed description illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or an equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

As an example, FIG. 12A attached hereto depicts an illustrative computer system 1010 that can run server-class applications such as databases and mail-servers. With reference to FIG. 12A, the computer system 1010 in one embodiment includes a processor module 1011 and operator interface elements comprising operator input components such as a keyboard 1012A and/or a mouse 1012B (or digitizing tablet or other analogous element(s), generally identified as operator input element(s) 1012) and an operator output element such as a video display device 1013. The illustrative computer system 1010 can be of a conventional stored-program computer architecture. The processor module 1011 can include, for example, one or more processor, memory and mass storage devices, such as disk and/or tape storage elements (not separately shown), which perform processing and storage operations in connection with digital data provided thereto. The operator input element(s) 1012 can be provided to permit an operator to input information for processing. The video display device 1013 can be provided to display output information generated by the processor module 1011 on a screen 1014 to the operator, including data that the operator may input for processing, information that the operator may input to control processing, as well as information generated during processing. The processor module 11 can generate information for display by the video display device 13 using a so-called "graphical user interface" ("GUI"), in which information for various applications programs is displayed using various "windows."

The terms "memory," "storage" and "disk storage devices" can encompass any computer readable medium, such as a computer hard disk, computer floppy disk, computer-readable flash drive, computer-readable RAM or ROM element or any other known means of encoding digital information. The term "applications programs," "applications," "programs," "computer program product" or "computer software product" can encompass any computer program product consisting of computer-readable programs instructions encoded and/or stored on a computer readable medium, whether that medium is fixed or removable, permanent or erasable, or otherwise. As noted, for example, in block 1122 of the schematic block diagram of FIG. 12C, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or it can take the form of a method or a system for carrying out such a method. Although the computer system 1010 is shown as comprising particular components, such as the keyboard 1012A and mouse 1012B for receiving input information from an operator, and a video display device 1013 for displaying output information to the operator, it will be appreciated that the computer system 1010 may include a variety of components in addition to or instead of those depicted in FIG. 12A.

In addition, the processor module 1011 can include one or more network ports, generally identified by reference numeral 1014, which are connected to communication links which connect the computer system 1010 in a computer network. The network ports enable the computer system 1010 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

In addition to the computer system 1010 shown in the drawings, methods, devices or software products in accordance with the present invention can operate on any of a wide range of conventional computing devices and systems, such as those depicted by way of example in FIGS. 12B and 12C (e.g., network system 1100), whether standalone, networked, portable or fixed, including conventional PCs 1102, laptops 1104, handheld or mobile computers 1106, or across the Internet or other networks 1108, which may in turn include servers 1110 and storage 1112.

In line with conventional computer software and hardware practice, a software application configured in accordance with the invention can operate within, e.g., a PC 1102 like that shown in FIGS. 12A-C, in which program instructions can be read from ROM or CD ROM 1116 (FIG. 12C), magnetic disk or other storage 1120 and loaded into RAM 1114 for execution by CPU 1118. Data can be input into the system via any known device or means, including a conventional keyboard, scanner, mouse, digitizing tablet, or other elements 1103. As shown in FIG. 12C, the depicted storage 1120 includes removable storage. As further shown in FIG. 12C, applications and data 1122 can be located on some or all of fixed or removable storage or ROM, or downloaded.

Those skilled in the art will also understand that method aspects of the present invention can be carried out within commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM, element, or any other known means of encoding, storing or providing digital information, whether local to or remote from the workstation, PC or other digital processing device or system. Various forms of computer readable elements and media are well known in the computing arts, and their selection is left to the implementer.

D. Conclusion

Those skilled in the art will appreciate that while the foregoing detailed description provides sufficient detail to enable one skilled in the art to practice the present invention, the various examples, embodiments and practices of the present invention that are discussed and described herein, in conjunction with the attached drawing figures, are provided by way of example, and not by way of limitation. Numerous variations, additions, and other modifications or different implementations of the present invention are possible, and are within the spirit and scope of the invention.

We claim:

1. A computer-implemented method, the method comprising:
    measuring utilization of one or more computing system components or groups of components to generate utilization information, wherein the utilization varies over time;
    generating, using the utilization information, an operating curve characteristic of the computing system;
    determining, by a processor module, at least one utilization value on the operating curve to be an x-coordinate of a kneepoint of the operating curve, the kneepoint being a unique property of the operating curve and being substantially constant for a performance queuing model representing one or more aspects of the performance of the computing system, the x-coordinate of the kneepoint is one of two points of maximum curvature of a behavior curve and represents a projection of a point of intersection between the operating curve and a best-fit exponential curve, the behavior curve is a linear operating region of a logarithm of the operating curve, the bounds of the linear operating region comprising at least two points on the x-axis of the operating curve;
    comparing a given utilization value to the x-coordinate of the kneepoint;
    setting a bound based on the x-coordinate of the kneepoint; and
    indicating an alarm condition when the given utilization value is above the bound based on the x-coordinate of the kneepoint.

2. The computer-implemented method in accordance with claim 1 wherein the linear operating region is calculated in a closed analytical form.

3. The computer-implemented method in accordance with claim 1 further comprising:
    evaluating system element performance by comparing system element utilization measurements with at least one operating curve kneepoint.

4. A system, the system comprising:
    a processor module; and
    at least one memory unit communicatively coupled to the processor module, the at least one memory unit configured to store one or more modules that, when executed by the processor module, are operative to:
        measure utilization of one or more computing system components or groups of components to generate utilization information, wherein the utilization varies over time;
        generate, using the utilization information, an operating curve characteristic of the computing system;
        determine at least one utilization value on the operating curve to be an x-coordinate of a kneepoint of the operating curve, the kneepoint being a unique property of the operating curve and being substantially constant for a performance queuing model representing one or more aspects of the performance of the computing system, the x-coordinate of the kneepoint is one of two points of maximum curvature of a behavior curve and represents a projection of a point of intersection between the operating curve and a curve determined using a selected curve fitting algorithm, the behavior curve is a linear operating region of a logarithm of the operating curve, the bounds of the linear operating region comprising at least two points on the x-axis of the operating curve;
        comparing a given utilization value to the x-coordinate of the kneepoint;
        setting a bound based on the x-coordinate of the kneepoint; and
        indicating an alarm condition when the given utilization value is above the bound based on the x-coordinate of the kneepoint.

5. The system in accordance with claim 4, wherein the linear operating region is calculated in a closed analytical form.

6. The system in accordance with claim 4, wherein the one or more modules are further operative to:
    evaluate system element performance by comparing system element utilization measurements with at least one operating curve kneepoint.

7. An article of manufacture comprising a non-transitory computer-readable storage medium comprising instructions that, when executed, cause a system to:

measure utilization of one or more computing system components or groups of components to generate utilization information, wherein the utilization varies over time;

generate, using the utilization information, an operating curve characteristic of the computing system;

determine at least one utilization value on the operating curve to be an x-coordinate of a kneepoint of the operating curve, the kneepoint being a unique property of the operating curve and being substantially constant for a performance queuing model representing one or more aspects of the performance of the computing system, the x-coordinate of the kneepoint is one of two points of maximum curvature of a behavior curve and represents a projection of a point of intersection between the operating curve and a curve determined using a selected curve fitting algorithm, the behavior curve is a linear operating region of a logarithm of the operating curve, the bounds of the linear operating region comprising at least two points on the x-axis of the operating curve;

compare a given utilization value to the x-coordinate of the kneepoint;

set a bound based on the x-coordinate of the kneepoint; and indicate an alarm condition when the given utilization value is above the bound based on the x-coordinate of the kneepoint.

8. The article of claim 7, wherein the linear operating region is calculated in a closed analytical form.

9. The article of claim 7, comprising instructions that, when executed, further cause the system to:

evaluate system element performance by comparing system element utilization measurements with at least one operating curve kneepoint.

* * * * *